United States Patent
Chang

(10) Patent No.: US 7,760,826 B2
(45) Date of Patent: Jul. 20, 2010

(54) APPARATUS FOR SUPPRESSING BURST NOISE AND METHOD THEREOF

(75) Inventor: Chiao-Chih Chang, Taipei (TW)

(73) Assignee: Mediatek Incorporation, Hsin-Chu (TW)

( * ) Notice: Subject to any disclaimer, the term of this patent is extended or adjusted under 35 U.S.C. 154(b) by 758 days.

(21) Appl. No.: 11/144,689

(22) Filed: Jun. 6, 2005

(65) Prior Publication Data

US 2006/0274866 A1 Dec. 7, 2006

(51) Int. Cl.
*H04B 1/10* (2006.01)
(52) U.S. Cl. ..................................................... 375/346
(58) Field of Classification Search .................. 375/346
See application file for complete search history.

(56) References Cited

U.S. PATENT DOCUMENTS

| 5,600,307 | A * | 2/1997 | Aslan .......................... 340/600 |
| 7,050,516 | B2 * | 5/2006 | Currivan et al. ............. 375/346 |
| 7,317,906 | B2 * | 1/2008 | Yao ............................. 455/296 |
| 7,327,813 | B2 | 2/2008 | Murakami et al. |
| 2003/0012127 | A1 * | 1/2003 | Kolze .......................... 370/204 |
| 2004/0184571 | A1 * | 9/2004 | Currivan et al. ............. 375/346 |
| 2004/0203392 | A1 * | 10/2004 | Hsu et al. ...................... 455/62 |
| 2005/0163196 | A1 * | 7/2005 | Currivan et al. ............. 375/144 |
| 2005/0179482 | A1 * | 8/2005 | Knoop et al. ................ 327/437 |

FOREIGN PATENT DOCUMENTS

CN 1595921 A 3/2005

* cited by examiner

*Primary Examiner*—David C Payne
*Assistant Examiner*—Nader Bolourchi
(74) *Attorney, Agent, or Firm*—Birch, Stewart, Kolasch & Birch, LLP

(57) ABSTRACT

An apparatus performs burst noise detection and then reduce the interference of the burst noise by controlling an operation of an adaptive apparatus, such as an equalizer. It includes: an adaptive apparatus having multiple coefficients, processing incoming signals according to these coefficients, and employing an error estimator to update the coefficients; a burst noise detector used to detect a burst noise; and an ON/OFF switching unit used to stop the error estimator from updating the coefficients when the burst noise is detected.

25 Claims, 16 Drawing Sheets

APPARATUS FOR SUPPRESSING BURST NOISE AND METHOD THEREOF

BACKGROUND OF THE INVENTION

1. Field of the Invention

The present invention is related to an apparatus and its method that are used to detect a burst noise and then reduce the interference of the burst noise by controlling an operation of an adaptive apparatus, such as an equalizer, so as to improve the robustness of the adaptive apparatus.

2. Description of Related Art

In general, a high-frequency radio signal receiving apparatus needs to be essentially immune to the influence of noise such as impulsive noise or burst noise. The burst noise and impulsive noise damage the normal operation of a receiver, especially the device with memory and feedback such as an equalizer and a Viterbi decoder. Once the state machines of these devices are triggered to an improper state, it usually requires a lot of time to recover the original state.

Reference is made to FIG. 16, which shows a block diagram of a conventional adaptive apparatus for equalizing the channel for signal transmission. As shown in this figure, the apparatus includes an equalizer 160, a decision circuit 162 and an error estimator 164. Therein, the equalizer 160 further has an output generating unit 1601 and multiple coefficient storage/updating circuits 1602. First, the signals received externally are inputted to the equalizer 160 and processed according to the coefficients of the equalizer 160 set previously. Then, the processed signals are sent to the decision circuit 162 for data recovery. After that, the recovered data is passed to the error estimator 164. The error estimator 164 is used to check the data received from the decision circuit 162 and update the coefficients of the equalizer according to the status of the received data. However, the conventional adaptive apparatus can only be used to equalize the long-term states of the occupied channel. Once an unexpected noise occurs, such as a burst noise, the apparatus will be influenced severely and require a lot of time to recover the original state.

SUMMARY OF THE INVENTION

An objective of the present invention is to provide an apparatus for suppressing a burst noise. The apparatus is used to perform burst noise detection and then reduce the interference of the burst noise by controlling an adaptive apparatus, such as an equalizer.

The present invention provides a burst noise suppressing apparatus. It includes: an adaptive apparatus for equalizing a signal-transmitting channel, the adaptive apparatus having a plurality of coefficients set therein and processing signals received from the signal-transmitting channel according to the coefficients, moreover, the adaptive apparatus employing an error estimator to update the coefficients according to a current state of the signal-transmitting channel; a burst noise detector used to detect a burst noise occurring in the signal-transmitting channel; and an ON/OFF switching unit used to stop the error estimator from updating the coefficients of the adaptive apparatus when the burst noise is detected by the burst noise detector.

DETAILED DESCRIPTION OF PREFERRED EMBODIMENTS

Figure 1:
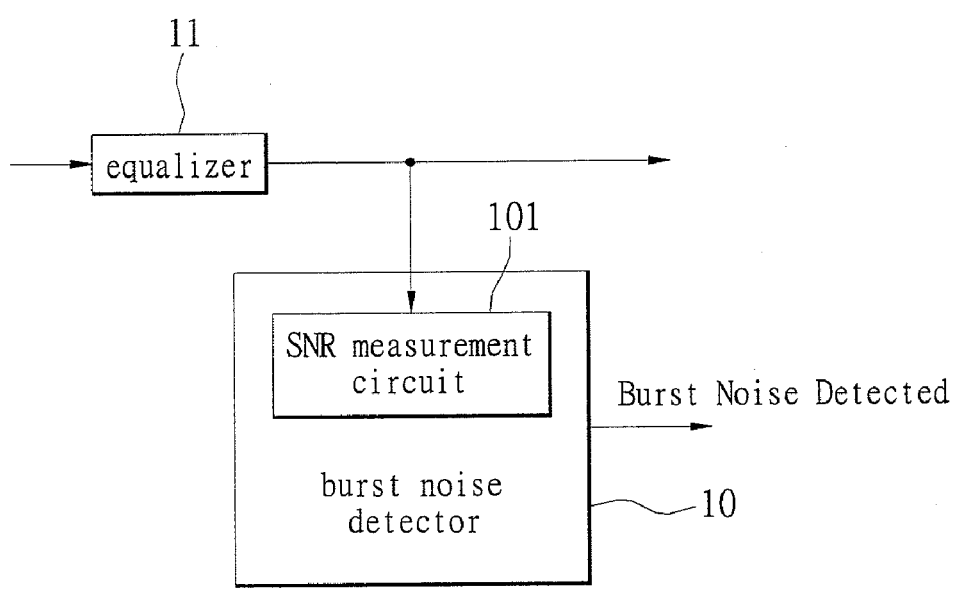
FIG. 1 is a schematic diagram of the first embodiment of a burst noise detector.
Figure 2:
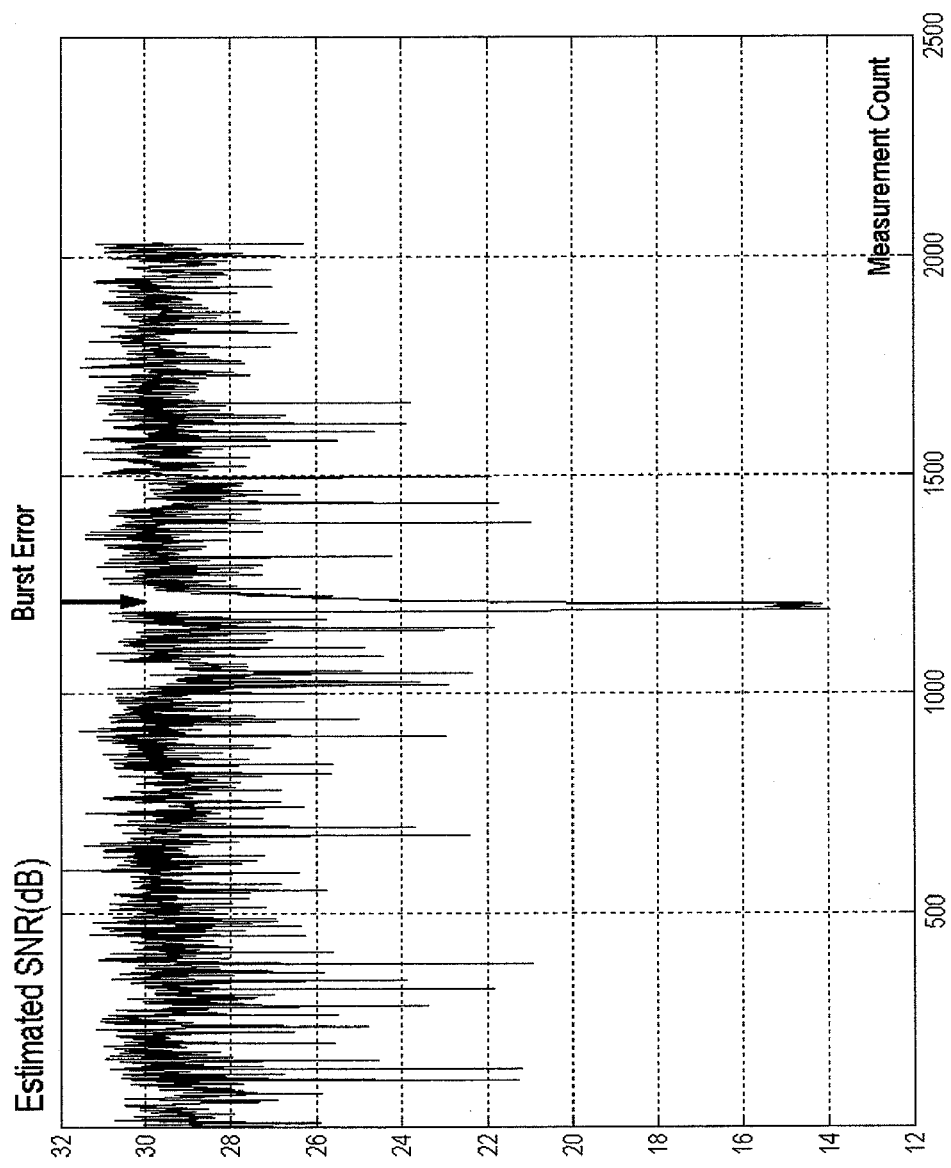
FIG. 2 shows an example of the measurement result of the SNR measurement circuit.

Reference is made to FIG. 1, which is a schematic diagram of the first embodiment of a burst noise detector in accordance with the present invention. The burst noise detector 10 of the present invention has a SNR measurement circuit 101, which is used to measure the SNR of the signals outputted from the equalizer 11. Reference is also made to FIG. 2, which shows an example of the measurement result of the SNR measurement circuit. As shown in FIG. 2, when burst noise occurs, the SNR of the signals outputted from the equalizer 11 drops rapidly. Thus, after the SNR measurement, the burst noise detector 10 can check if there is a great drop in SNR. If a SNR drop larger than a present value occurs, the burst noise detector 10 determines that a burst noise occurs and sends a signal out to control the equalizer 11.

Figure 3:
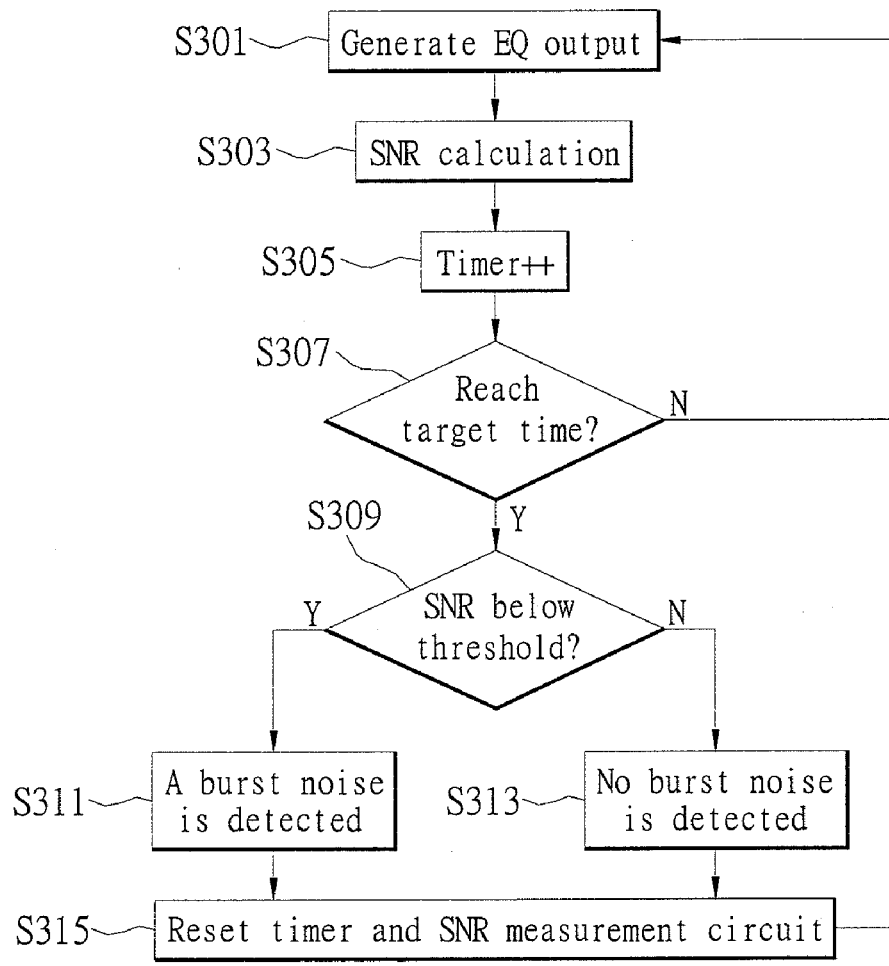
FIG. 3 is a flow chart for illustrating the operation of the burst noise detector of the first embodiment.

FIG. 3 is a flow chart for illustrating the operation of the burst noise detector. First, after processing the signals received, the equalizer 11 (EQ) generates corresponding output signals (step S301). Next, the SNR measurement circuit 101 calculates the SNR value according to the signals outputted from the equalizer 11 (step S303). Then, a timer is used to count the calculating time of the SNR measurement circuit 101 (step S305). In this embodiment, the burst noise detector 10 continuously checks the value of the timer. If the calculating time of the SNR measurement circuit 101 exceeds the preset target time, go to step S309; otherwise, go to step S301 (step S307). In step S309, the burst noise detector 10 checks if the SNR value provided from the SNR measurement circuit 101 is lower than a preset threshold. If yes, go to step S311; otherwise, go to step S313. In step S311, the burst noise detector 10 determines that a burst noise occurs. In step S313, the burst noise detector 10 determines that no burst noise occurs. Finally, the burst noise detector 10 resets the timer and the SNR measurement circuit 101.

Figure 4:
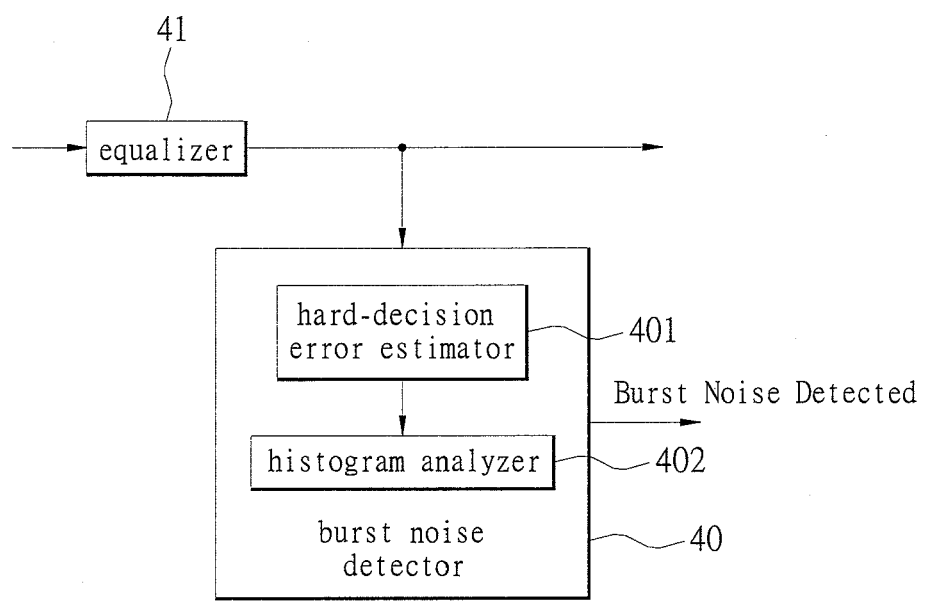
FIG. 4 is a schematic diagram of the second embodiment of a burst noise detector.

Reference is made to FIG. 4, which is a schematic diagram of the second embodiment of a burst noise detector. As shown in FIG. 4, the burst noise detector 40 has a hard-decision error estimator 401 and a histogram analyzer 402. First, after receiving the signals outputted from the equalizer 41, the hard-decision error estimator 401 is used to estimate the difference between the received signals and a preset threshold and then send the estimated values to the histogram analyzer 402 for later processing.

Figure 5:
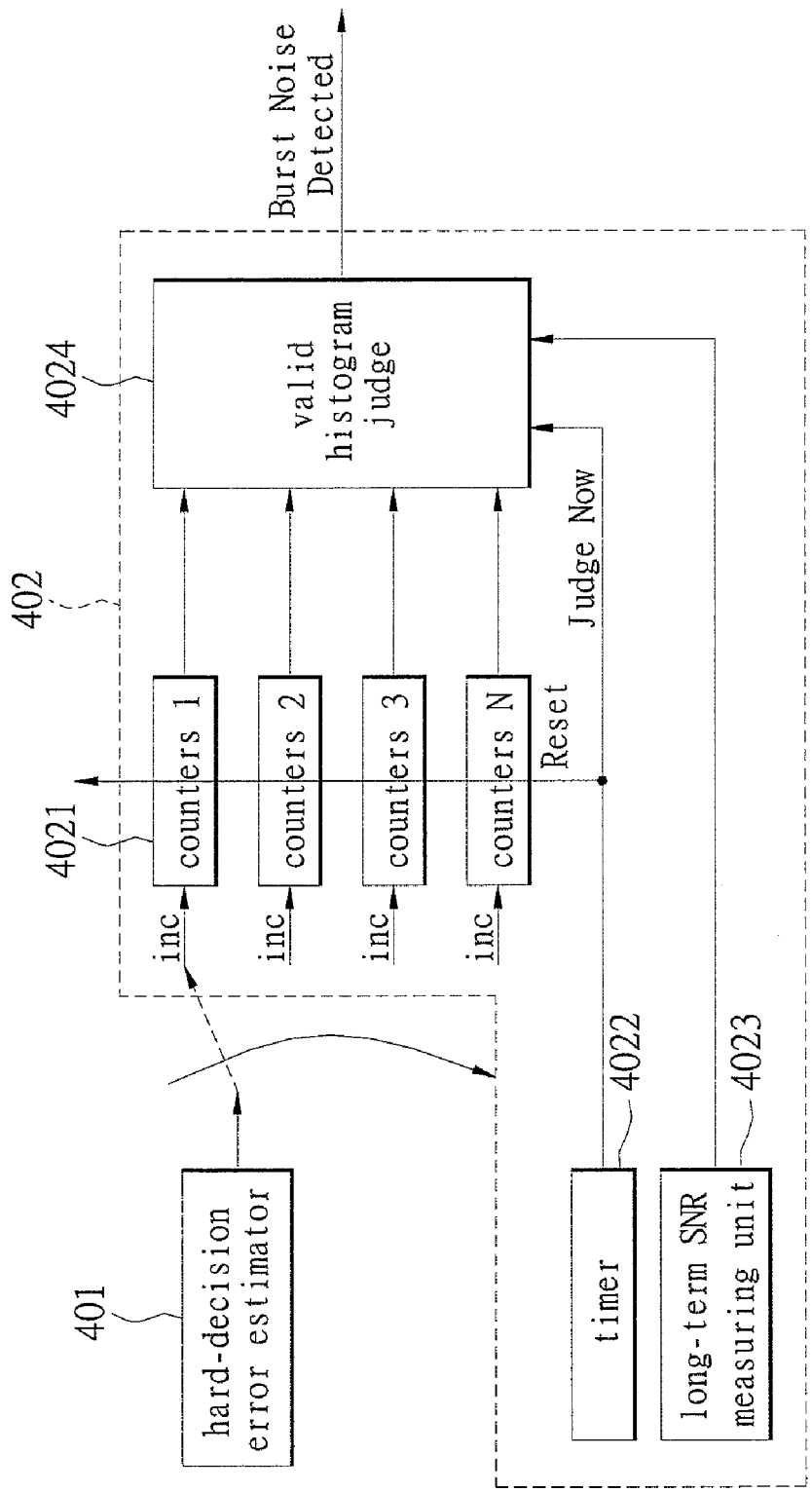
FIG. 5 is a schematic diagram of the histogram analyzer in accordance of the second embodiment.

Reference is made to FIG. 5, which is a schematic diagram of the histogram analyzer. As shown in FIG. 5, the histogram analyzer 402 includes multiple counters 4021, a timer 4022, a long-term SNR measuring unit 4023 and a valid histogram judge 4024. Therein, the counters 4021 are assigned to count the number of the estimated values belonging to different histogram sections, which have different ranges. When the estimated values sent from the hard-decision error estimator 401 is received, each of the counters 4021 counts the number of the estimated values belonging to its own histogram section and sends the counting result to the valid histogram judge 4024 after a predetermined time period. Then, the valid histogram judge 4024 compares the counting results of the counters 4021 with the preset values of an upper bound recorded in a look-up table. If the counting results are larger than the upper bound, the valid histogram judge 4024 determines that a burst noise occurs and sends a signal out to control the equalizer. Therein, in practice, the valid histogram judge 4024 can includes multiple look-up tables having various upper bounds. Depending on the channel state, the valid histogram judge 4024 selects a suitable look-up table to perform the judging process.

Furthermore, the timer 4022 is used to count time and send a time signal to the counters 4021 and the valid histogram judge 4024 when the predetermined time expires. The long-term SNR measuring unit 4023 is used to measure the SNR value over a time period that is much longer than the predetermined time set in the timer 4022 to acquire the valid channel state and send the SNR value to the valid histogram judge 4024 for table selection.

Figure 6:
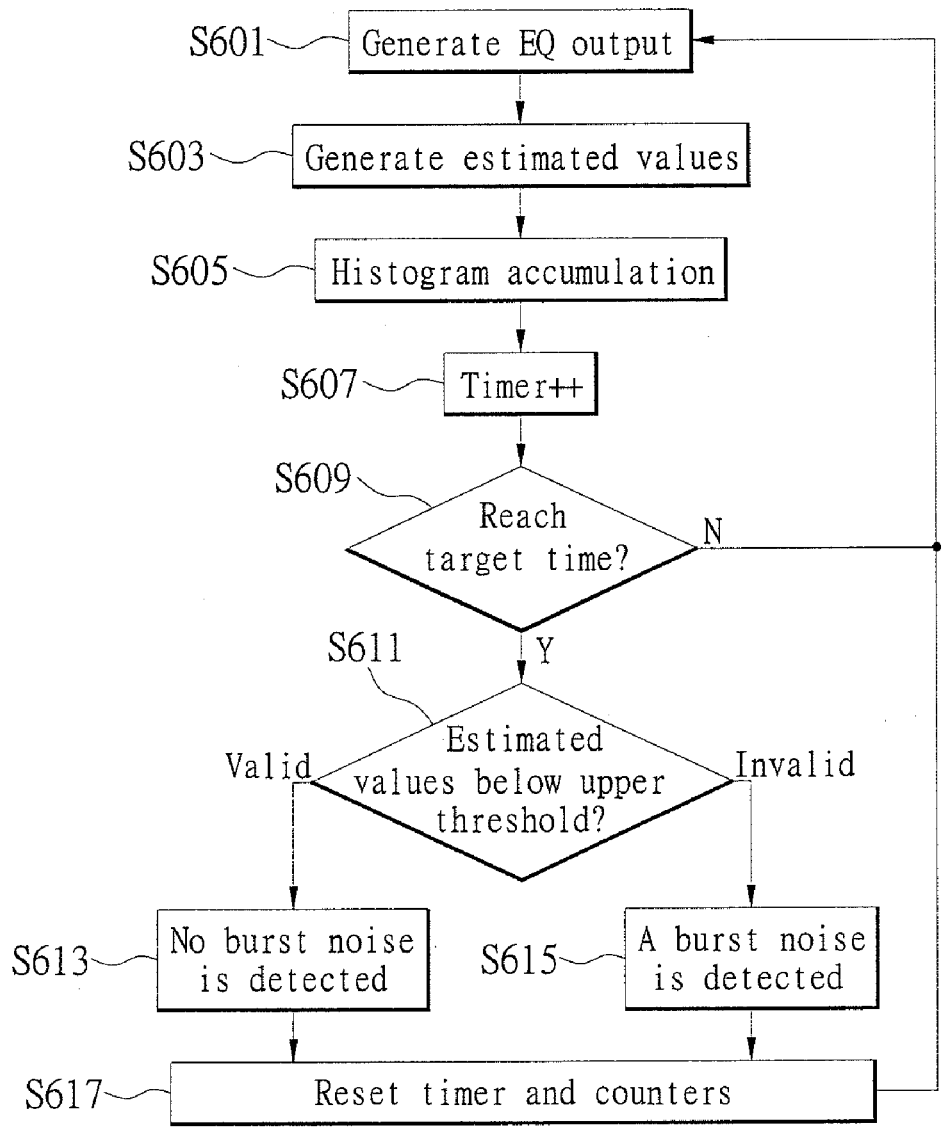
FIG. 6 is a flow chart for illustrating the operation of the burst noise detector of the second embodiment.

FIG. 6 is a flow chart for illustrating the operation of the burst noise detector. First, after processing the signals received, the equalizer 41 (EQ) generates corresponding output signals (step S601). Next, the hard-decision error estimator 401 estimates the difference between the received signals and a preset threshold and then send the estimated values to the counters 4021 (step S603). After receiving the estimated values from the hard-decision error estimator 401, each of the counters 4021 counts the number of the estimated values belonging to its own histogram section for histogram accumulation and sends the counting result to the valid histogram judge 4024 (step S605). Furthermore, the timer 4022 counts time and sends a time signal to the counters 4021 and the valid histogram judge 4024 when the target time expires (step S607). If the target time expires, go to step S611; otherwise, go to step S601 (step S609). In step S611, the valid histogram judge 4024 compares the counting results of the counters 4021 with the preset values of an upper bound recorded in a look-up table. If the counting results are smaller than the upper bound, the valid histogram judge 4024 determines that no burst noise occurs (step S613). Otherwise, the valid histogram judge 4024 determines that a burst noise occurs and sends a signal out to control the equalizer 41 (step S615). Finally, the burst noise detector 40 resets the timer 4022 and the counters 4021.

Figure 7:
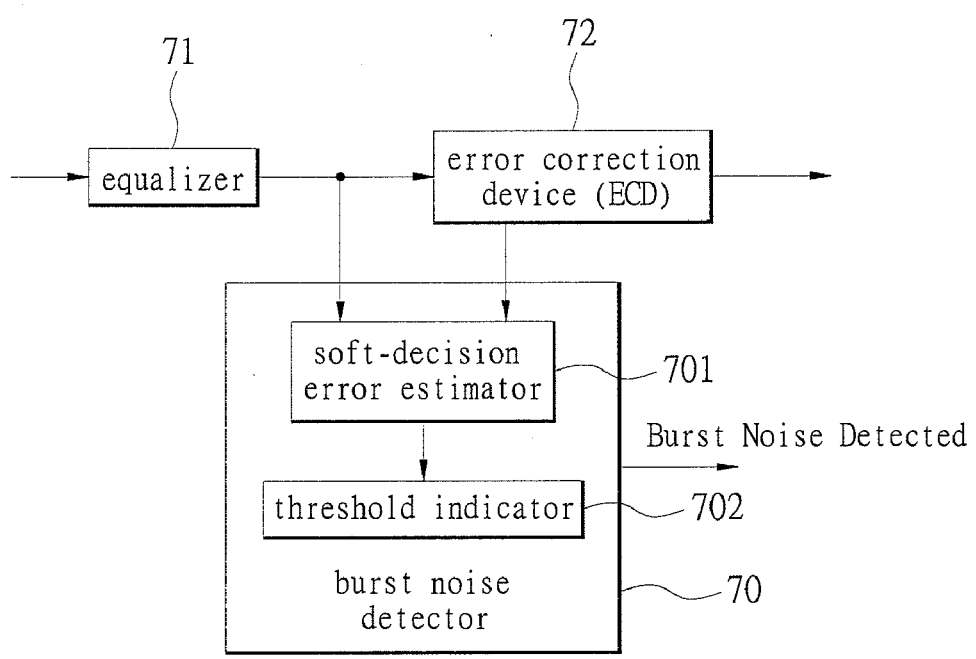
FIG. 7 is a schematic diagram of the third embodiment of a burst noise detector.

Reference is made to FIG. 7, which is a schematic diagram of the third embodiment of a burst noise detector. As shown in FIG. 7, the burst noise detector 70 has a soft-decision error estimator 701 and a threshold indicator 702. First, after receiving the signals outputted from the equalizer 71, the soft-decision error estimator 701 is used to estimate the difference between the received signals and decoded signals sent from an error correction device (ECD) 72, such as a trellis-coded modulation (TCM) decoder, and then send the estimated values to the threshold indicator 702. Then, the threshold indicator 702 checks the estimated values. If the number of the estimated values larger than the first predetermined threshold (Thres1) or smaller than the second predetermined threshold (Thres2) exceeds a target value, the threshold indicator 702 determines that a burst noise occurs and sends a signal out to control the equalizer 71.

Figure 8:
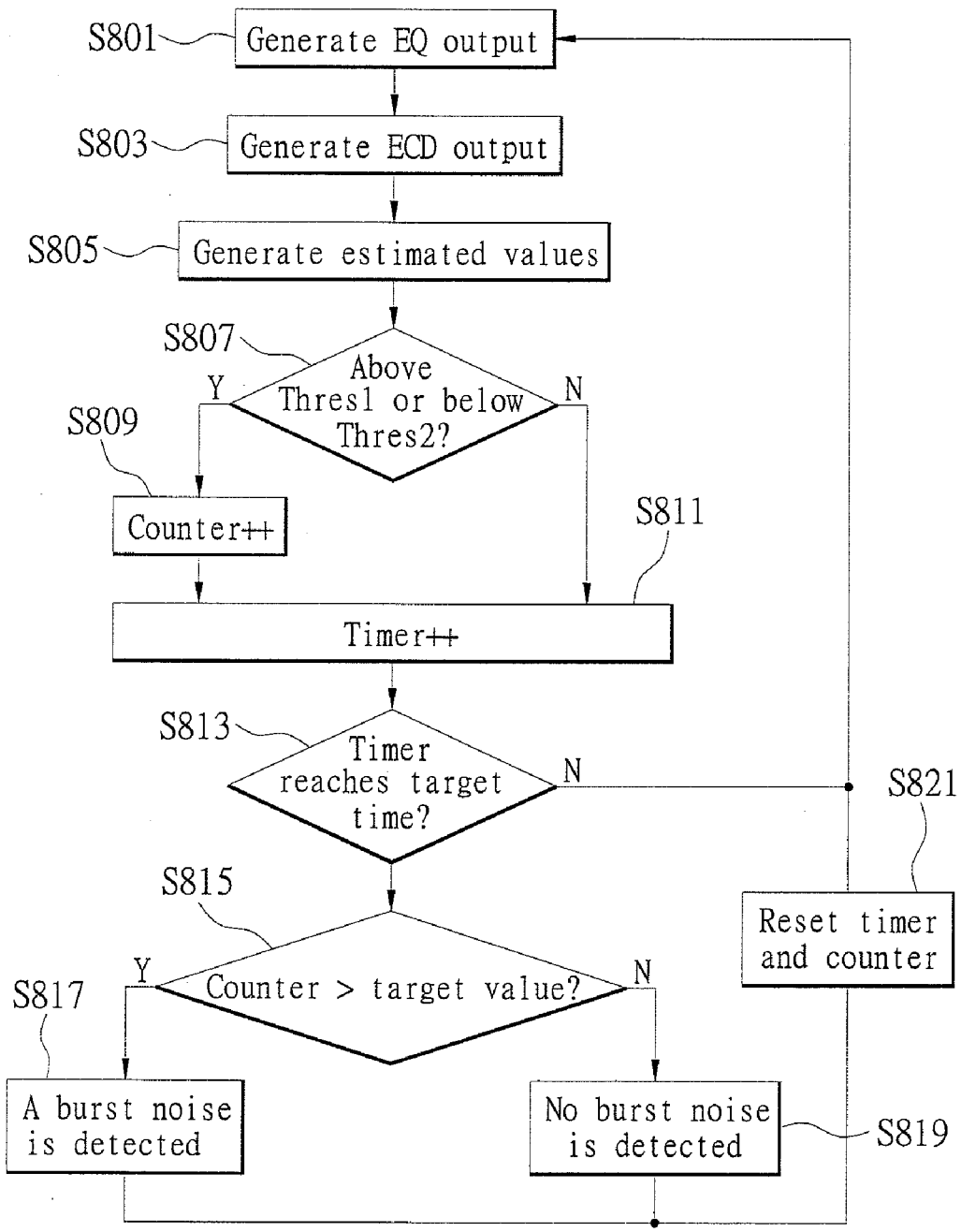
FIG. 8 is a flow chart for illustrating the operation of the burst noise detector of the third embodiment.

FIG. 8 is a flow chart for illustrating the operation of the burst noise detector. First, after processing the signals received, the equalizer 71 (EQ) generates corresponding output signals (step S801). After receiving the signals outputted from the equalizer 71, the error correction device 72 decodes the signals via a soft-decoding algorithm and then outputs ECD signals (step S803). Next, the soft-decision error estimator 701 estimates the difference between the signals received from the equalizer 71 and the error correction device 72 and then send the estimated values to the threshold indicator 702 (step S805). After receiving the estimated values from the soft-decision error estimator 701, the threshold indicator 702 checks the estimated values. If the estimated values are larger than the first predetermined threshold (Thres1) or smaller than the second predetermined threshold (Thres2), go to step S809; otherwise, go to step S811 directly. In step S809, a counter of the threshold indicator 702 counts the number of the estimated values larger than the first predetermined threshold (Thres1) or smaller than the second predetermined threshold (Thres2). In step S811, a timer of the threshold indicator 702 counts time. If a target time set in the timer expires, go to step S815; otherwise, go back to step S801. In step S815, the threshold indicator 702 checks if the number counted by the counter exceeds a target value. If yes, the threshold indicator 702 determines that a burst noise occurs and sends a signal out to control the equalizer 71 (step S817). Otherwise, the threshold indicator 702 determines that no burst noise occurs (step S819). Finally, the burst noise detector 70 resets the timer and the counter of the threshold indicator 702.

Figure 9:
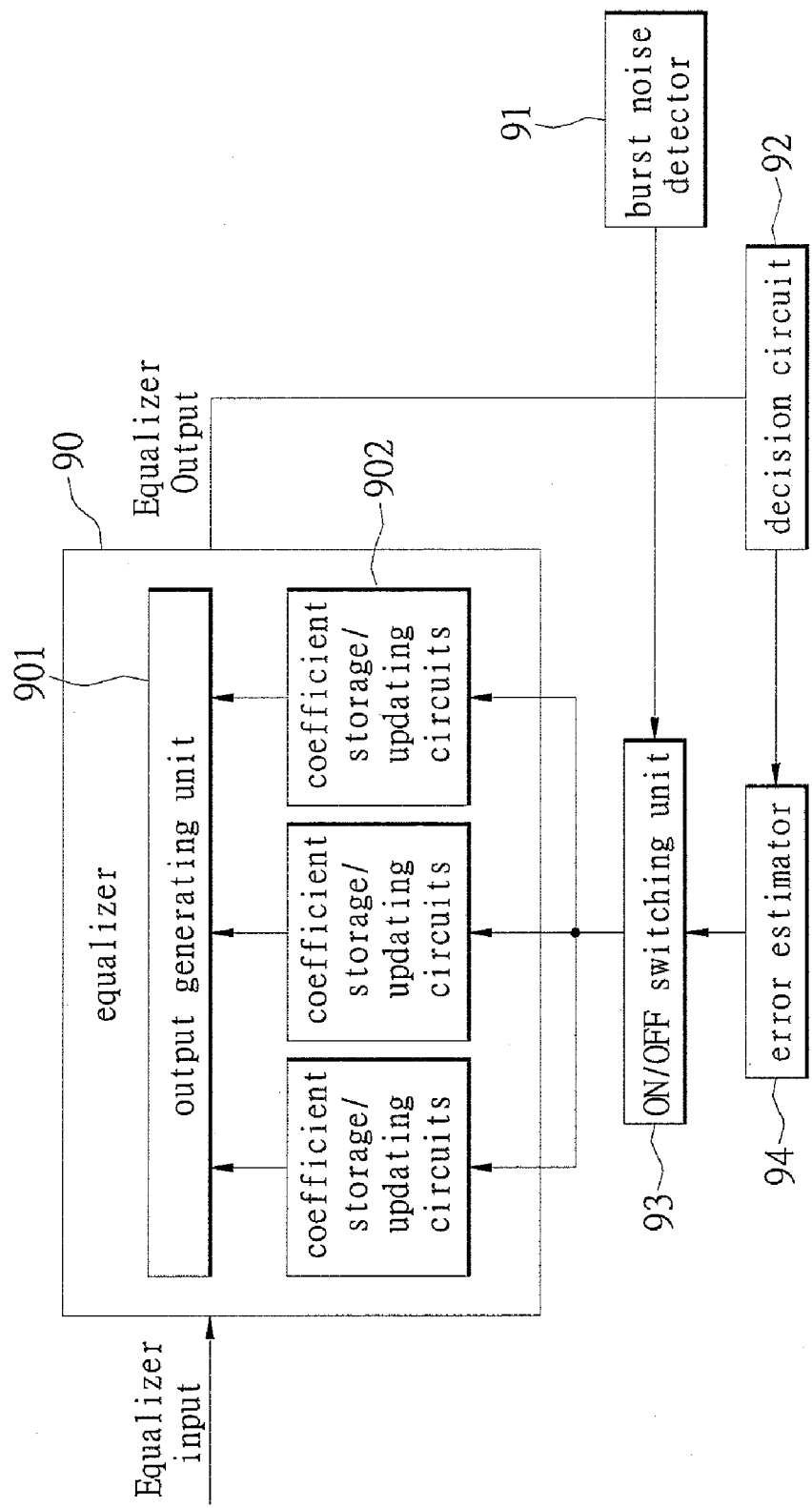
FIG. 9 is a schematic diagram of a burst noise suppressing apparatus in accordance with the fourth embodiment of the present invention.
Figure 16:
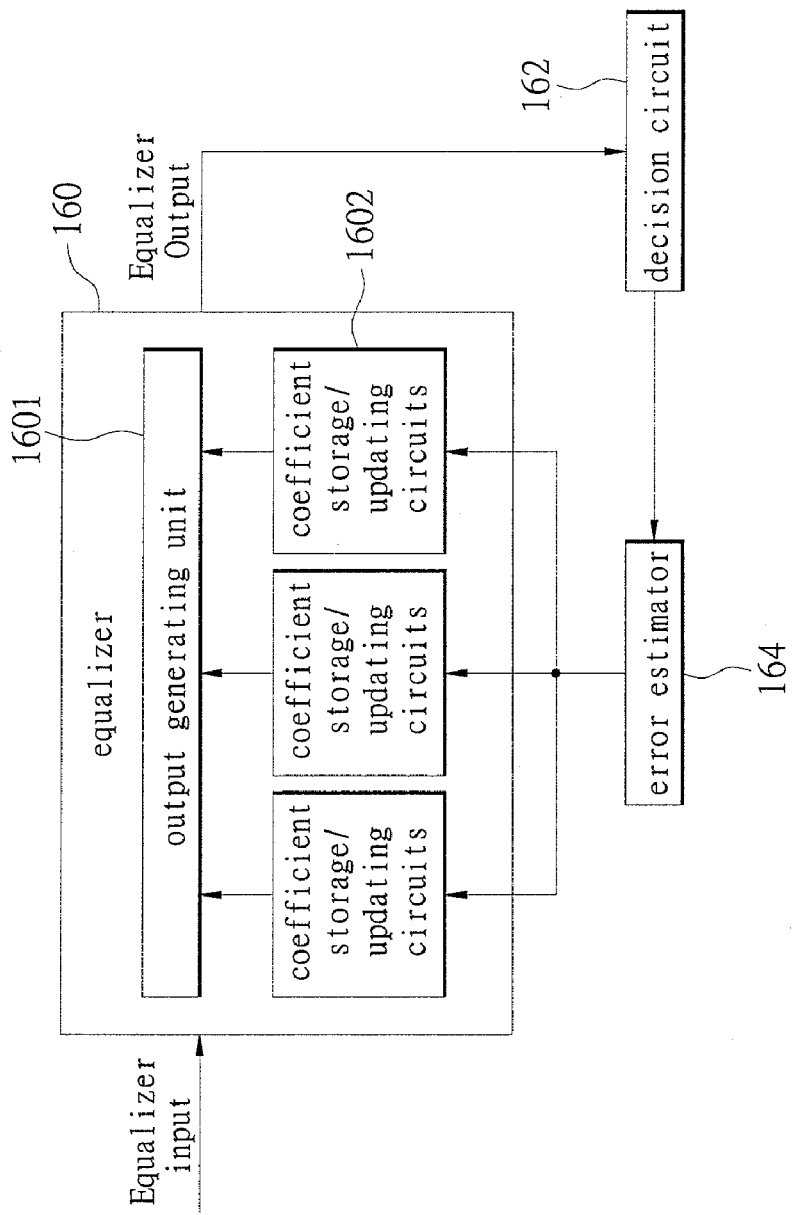
FIG. 16 shows a block diagram of a conventional adaptive apparatus.

Reference is made to FIG. 9, which is a schematic diagram of a burst noise suppressing apparatus in accordance with the fourth embodiment of the present invention. As shown in FIG. 9, the apparatus of the present invention includes an equalizer 90, a burst noise detector 91, a decision circuit 92, an error estimator 94 and an ON/OFF switching unit 93. The equalizer 90 further has an output generating unit 901 and multiple coefficient storage/updating circuits 902. It should be noted that the apparatus of the present invention is similar to that of the prior art shown in FIG. 16. The difference is that the apparatus of the present invention further has the ON/OFF switching unit 93 and the burst noise detector 91. In the prior art, the coefficients of the equalizer are updated directly according to the error estimator even though a burst nose occurs. However, in the present invention, when the burst noise detector 91 detects a burst noise, it drives the ON/OFF switching unit 93 to stop the signal transfer from the error estimator 94 to the equalizer 90. Thus, when a burst noise occurs, the coefficients of the equalizer 90 are frozen to prevent the interference of the burst noise.

Figure 10:
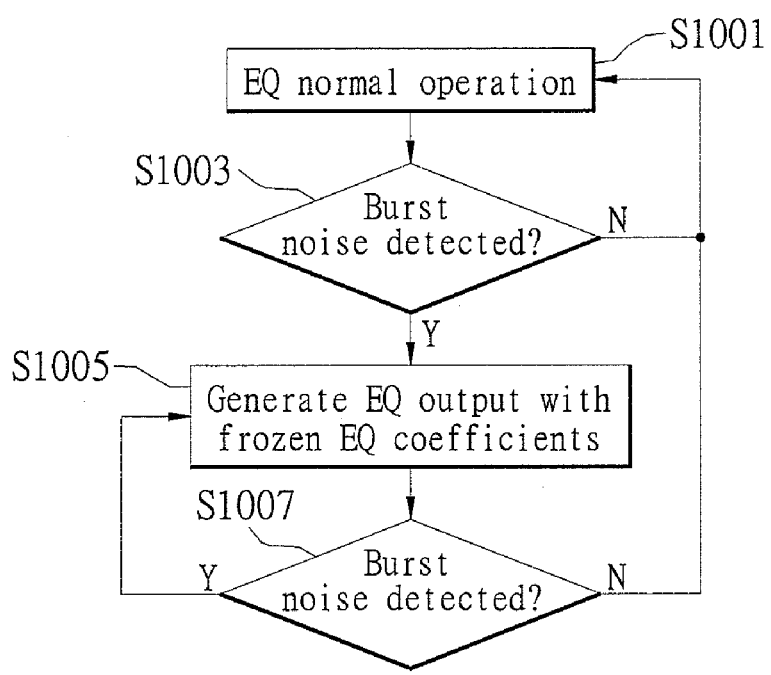
FIG. 10 is a flow chart for illustrating the operation of the burst noise suppressing apparatus of the fourth embodiment.

FIG. 10 is a flow chart for illustrating the operation of the burst noise suppressing apparatus. Initially, when on burst noise occurs, the equalizer 90 (EQ) performs normal operation (step S1001). And the burst noise detector 91 keeps detecting the burst noise. If the burst noise detector 91 detects a burst noise, go to step S1005; otherwise, go back to step S1001 (step S1003). Once a burst noise is detected, the burst noise detector 91 drives the ON/OFF switching unit 93 to stop the signal transfer from the error estimator 94 to the equalizer 90. The coefficients of the equalizer 90 are thus frozen. Hence, the equalizer 90 generates output signals with frozen coefficients (step S1005). And the burst noise detector 91 still keeps detecting the burst noise when the coefficients of the equalizer 90 are frozen. If the burst noise detector 91 still detects a burst noise, go back to step S1005; otherwise, go to step S1001 (step S1007). In this way, the equalizer 90 of the present invention performs a normal operation when no burst noise occurs and a coefficient-freezing operation to prevent the interference of the burst noise when a burst noise occurs.

However, in the fourth embodiment of the burst noise suppressing apparatus, a part of the coefficients of the equalizer may be affected by the burst noise before being frozen, because the incoming signals received externally is first delivered to the equalizer and then to burst noise detector. In order to further improve the apparatus of the present invention, the second embodiment is proposed.

Figure 11:
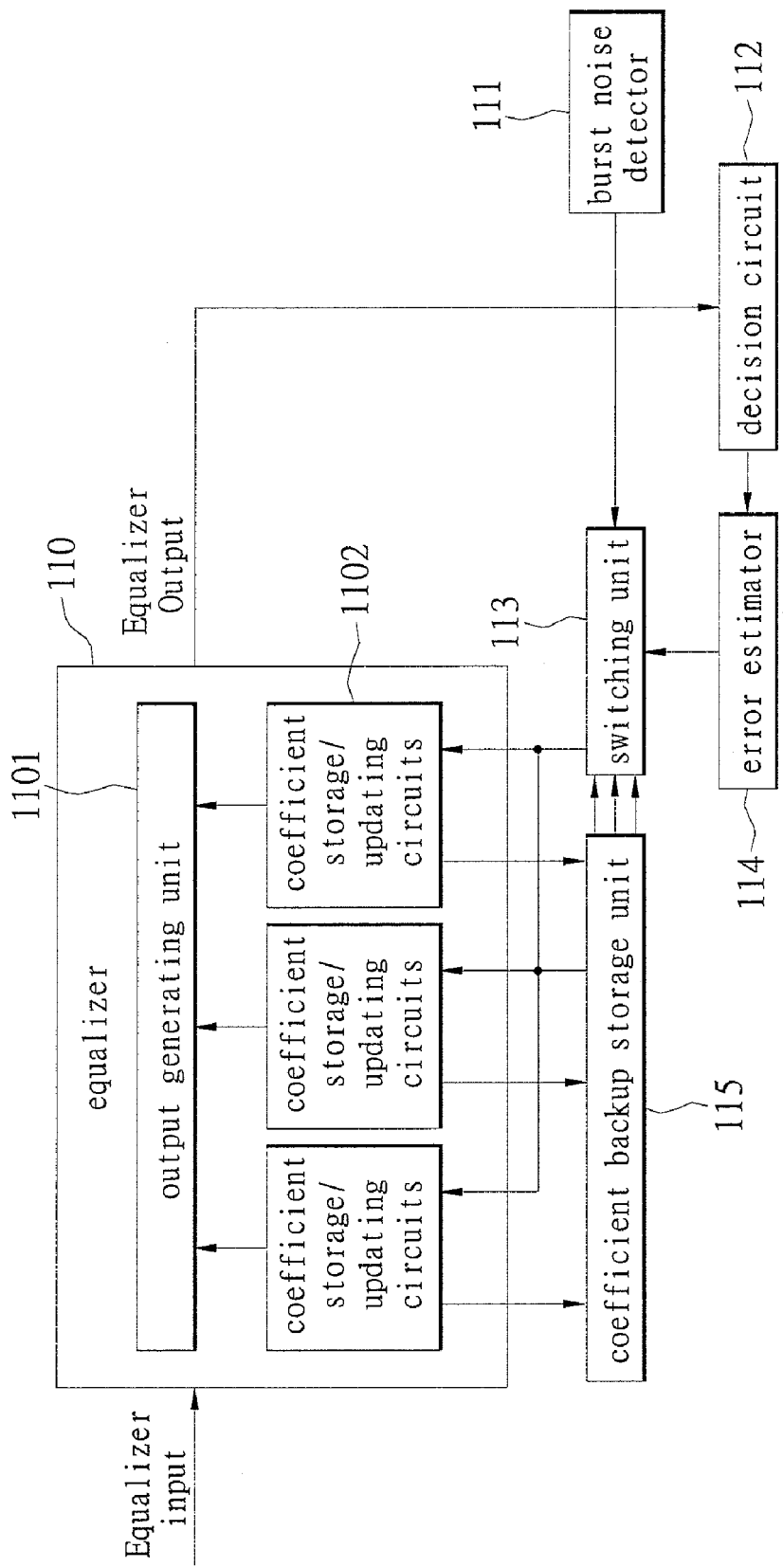
FIG. 11 is a schematic diagram of a burst noise suppressing apparatus in accordance with the fifth embodiment of the present invention.

Reference is made to FIG. 11, which is a schematic diagram of a burst noise suppressing apparatus in accordance with the fifth embodiment of the present invention. The apparatus includes an equalizer 110, a burst noise detector 111, a decision circuit 112, a switching unit 113, an error estimator 114 and a coefficient backup storage unit 115. The equalizer 110 further has an output generating unit 1101 and multiple coefficient storage/updating circuits 1102. It should be noted that the apparatus of the fifth embodiment of the present invention is similar to that of the fourth embodiment shown in FIG. 9. The difference is that the apparatus of the fifth embodiment further has the coefficient backup storage unit 115 and the function of the switching unit 113 is slightly different to that of the ON/OFF switching unit 93. The coefficient backup storage unit 115 is used to periodically backup the coefficients of the coefficient storage/updating circuits 1102.

When there is no burst noise detected, the burst noise detector 111 makes the switching unit 113 keep in a normal state. Thus, the equalizer 110, the decision circuit 112 and the error estimator 114 function as the prior art. However, once the burst noise detector 111 detects a burst noise, it drives the switching unit 113 to stop the signal transfer from the error estimator 114 to the equalizer 110 and transfer the coefficients previously stored in the coefficient backup storage unit 115 to the equalizer 110. Thus, when a burst noise occurs, the coefficients of the equalizer 110 are replaced by the backup coefficients sent from the coefficient backup storage unit 115. In this way, the coefficients of the equalizer that are likely affected by the burst noise is replaced by the backup coefficients that are stored when no burst noise occurs. Therefore, the fifth embodiment further reduces the interference of the burst noise.

Figure 12:
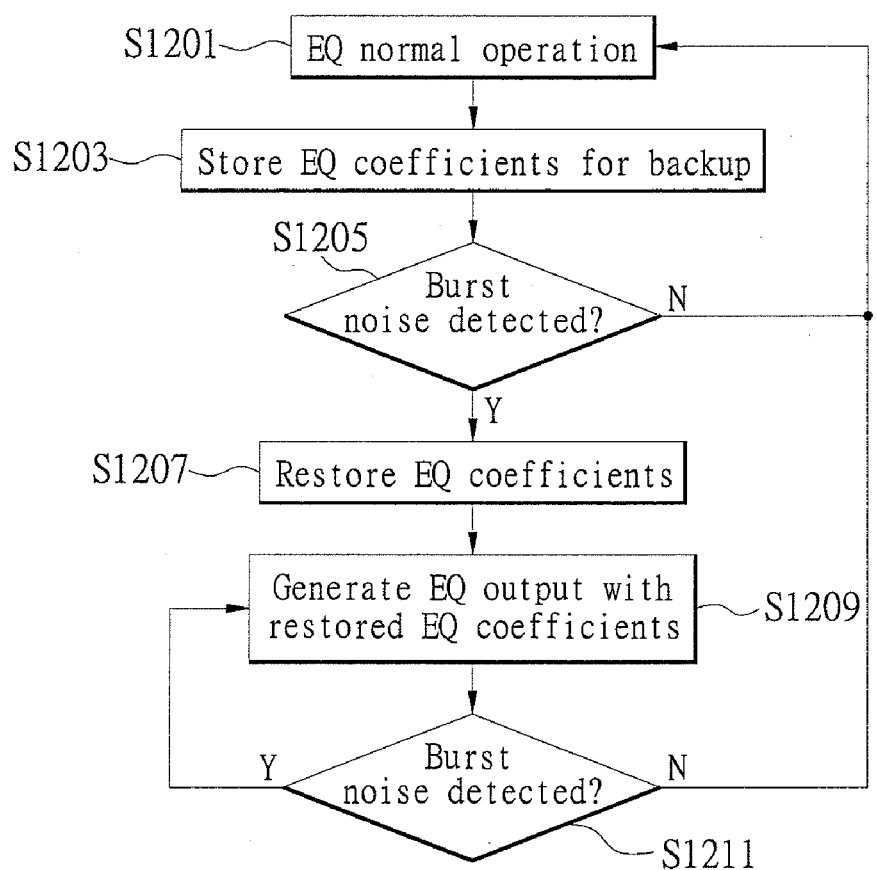
FIG. 12 is a flow chart for illustrating the operation of the burst noise suppressing apparatus of the fifth embodiment.

FIG. 12 is a flow chart for illustrating the operation of the burst noise suppressing apparatus. Initially, when on burst noise occurs, the equalizer 110 (EQ) performs a normal operation (step S1201). And the burst noise detector 111 keeps detecting the burst noise. When the normal operation is performed, the coefficient backup storage unit 115 periodically backups the coefficients of the coefficient storage/updating circuits 1102 (step S1203). If the burst noise detector 111 detects a burst noise, go to step S1207; otherwise, go back to step S1201 (step S1205). Once a burst noise is detected, the burst noise detector 111 drives the switching unit 113 to stop the signal transfer from the error estimator 114 to the equalizer 110 and transfer the coefficients previously stored in the coefficient backup storage unit 115 to the equalizer 110. Thus, when a burst noise occurs, the coefficients of the equalizer 110 are restored by using the backup coefficients sent from the coefficient backup storage unit 115 (step S1207). Hence, the equalizer 110 generates output signals with restored EQ coefficients (step S1209). And the burst noise detector 111 still keeps detecting the burst noise when the coefficients of the equalizer 110 are restored. If the burst noise detector 111 still detects a burst noise, go back to step S1209; otherwise, go to step S1201 (step S1211). In this way, the equalizer 110 of the fifth embodiment performs a normal operation when no burst noise occurs and a coefficient-restored operation to prevent the interference of the burst noise when a burst noise occurs.

Figure 13:
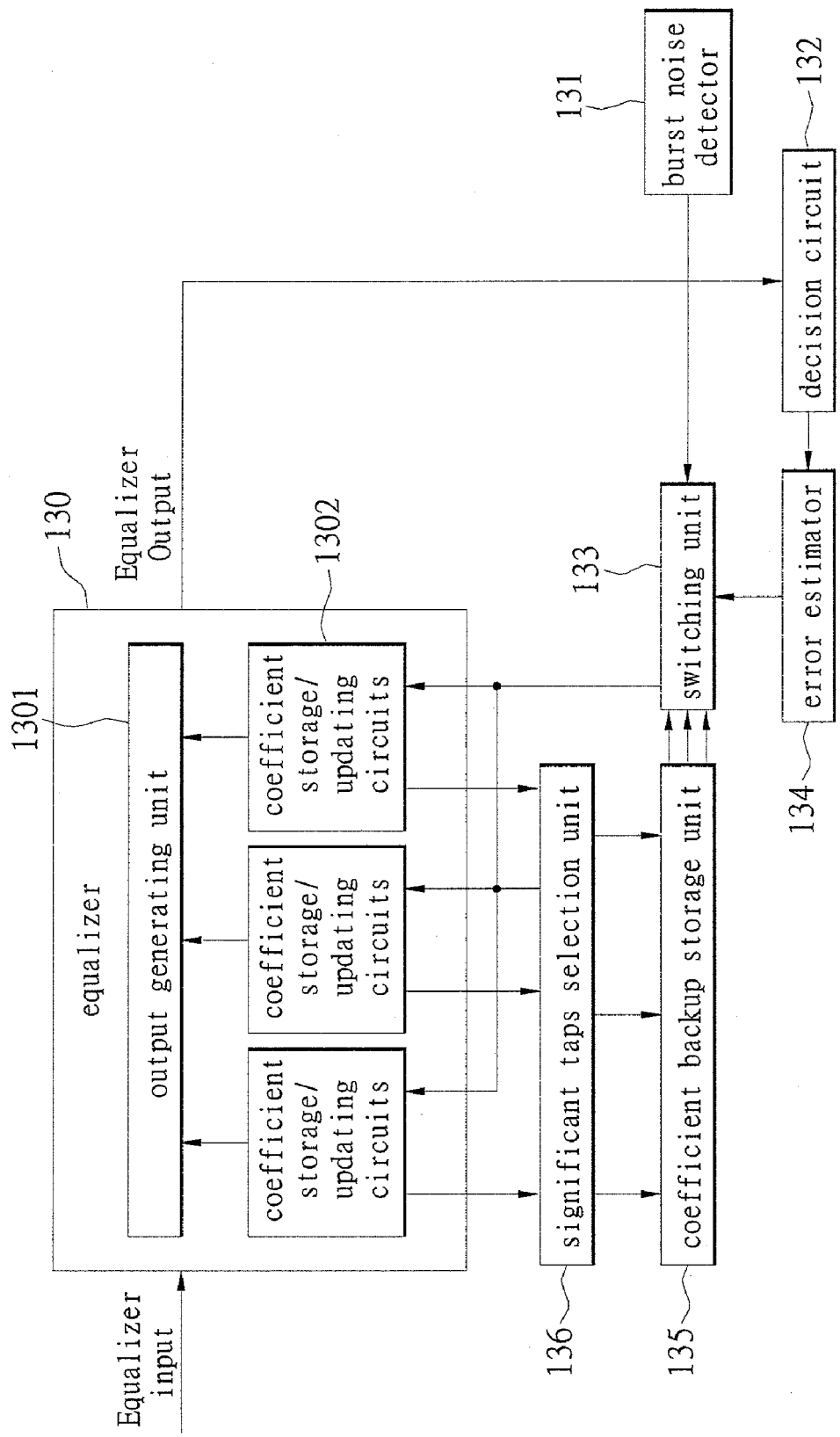
FIG. 13 is a schematic diagram of a burst noise suppressing apparatus in accordance with the sixth embodiment of the present invention.

However, since the number of the coefficients of the equalizer is quite considerable, the coefficient backup storage unit 115 used in the fifth embodiment must have a large storing capacity. That increases the cost. Hence, in order to reduce the cost, the third embodiment is proposed. Reference is made to FIG. 13, which is a schematic diagram of a burst noise suppressing apparatus in accordance with the third embodiment of the present invention. As shown in FIG. 13, the apparatus of the present invention includes an equalizer 130, a burst noise detector 131, a decision circuit 132, a switching unit 133, an error estimator 134, a coefficient backup storage unit 135 and a significant taps selection unit 136.

The sixth embodiment of the present invention is quite similar to the fifth embodiment. The only difference is that the sixth embodiment further includes the significant taps selection unit 136. In the sixth embodiment, the significant taps selection unit 136 is used to check if the coefficients of the equalizer 130 are significant and only pass the significant coefficients to the coefficient backup storage unit 135. Thus, the coefficient backup storage unit 135 only needs to backup the significant coefficients and the necessary storing capacity can be greatly reduced.

Figure 14:
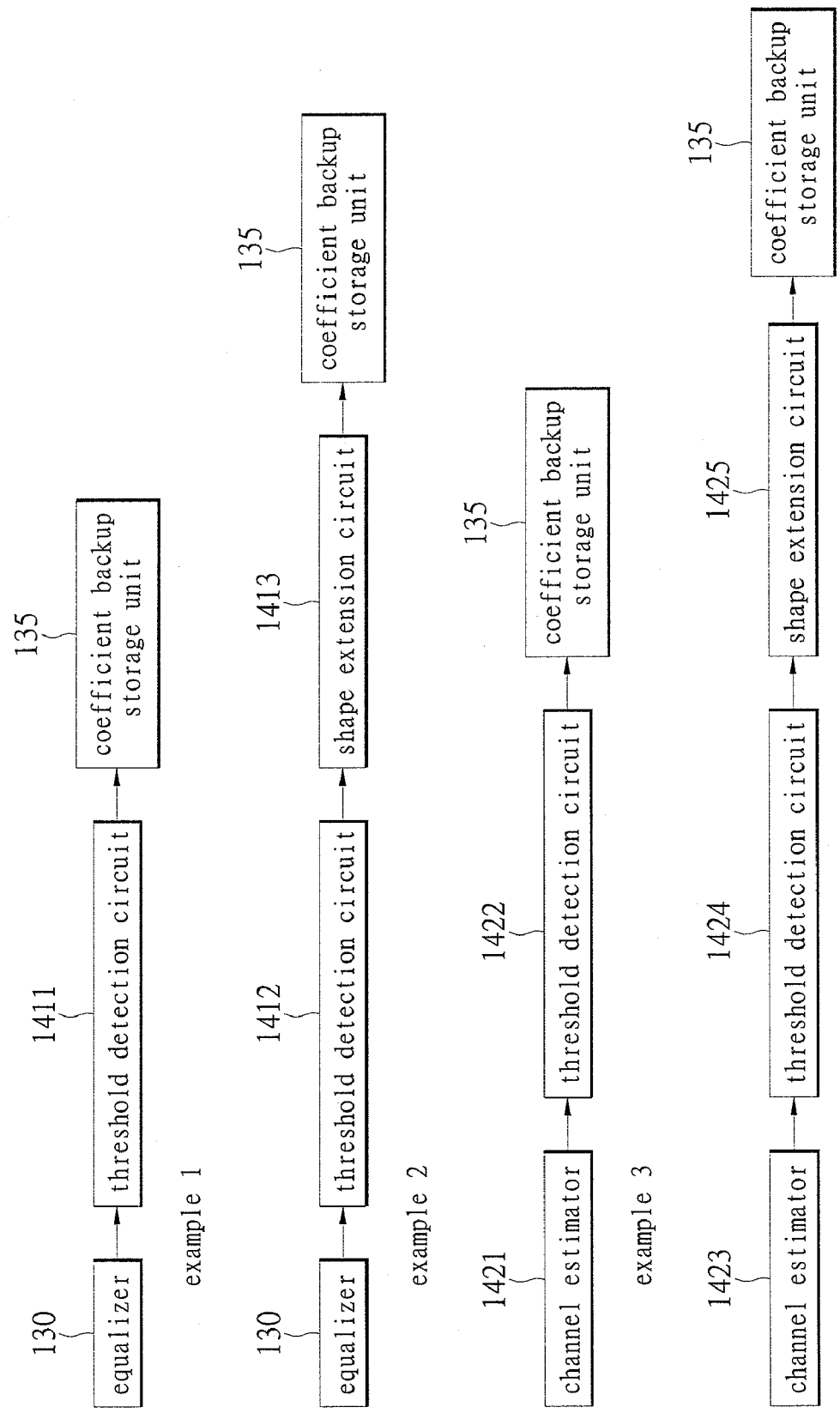
FIG. 14 shows four examples of the significant taps selection unit.

Reference is made to FIG. 14, which shows four examples of the significant taps selection unit. As shown in FIG. 14, the first example of the significant taps selection unit 136 has a threshold detection circuit 1411. First, the coefficients of the equalizer 130 are inputted into the threshold detection circuit 1411 to find the significant coefficients. In general, the absolute values of significant coefficients are usually larger than that of others coefficients. Thus, the threshold detection circuit 1411 has an upper threshold and a lower threshold. When the threshold detection circuit 1411 finds coefficients that are larger than the upper threshold or smaller that the lower threshold, it stores these coefficients, i.e. significant coefficients, into the coefficients backup storage unit 135.

In the second example, the significant taps selection unit 136 has a threshold detection circuit 1412 and a shape extension circuit 1413. First, the coefficients of the equalizer 130 are inputted into the threshold detection circuit 1412 to find the significant coefficients. Similarly, the threshold detection circuit 1412 has an upper threshold and a lower threshold. When the threshold detection circuit 1412 finds coefficients that are larger than the upper threshold or smaller that the lower threshold, it marks these coefficients and sends the marking information to the shape extension circuit 1413. Since the coefficients located adjacent these marked coefficients have a high probability to be significant, the shape extension circuit 1413 is used to select the marked coefficients and their adjacent coefficients as significant coefficients and store these significant coefficients into the coefficients backup storage unit 135.

In the third example, the significant taps selection unit 136 has a channel estimator 1421 and a threshold detection circuit 1422. First, the channel estimator 1421 is used to check the current channel state and send the channel information to the threshold detection circuit 1422. Then, by using the channel information provided from the channel estimator 1421, the threshold detection circuit 1411 uses at least one threshold to find which coefficients of the equalizer 130 are significant and stores these significant coefficients into the coefficients backup storage unit 135.

Figure 15:
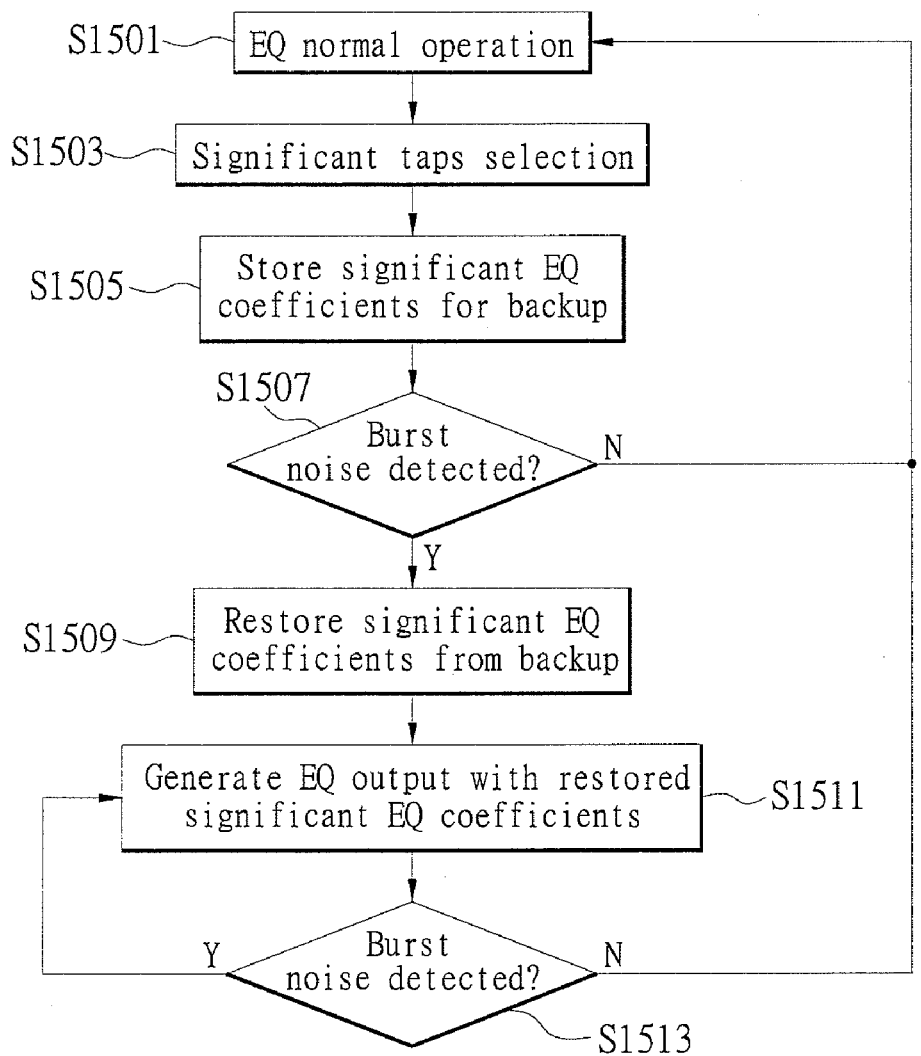
FIG. 15 is a flow chart for illustrating the operation of the burst noise suppressing apparatus of the sixth embodiment.

In the fourth example, the significant taps selection unit 136 has a channel estimator 1423, a threshold detection circuit 1424 and a shape extension circuit 1425. Similarly, the channel estimator 1423 is used to check the current channel state and send the channel information to the threshold detection circuit 1424. Then, by using the channel information provided from the channel estimator 1423, the threshold detection circuit 1424 uses at least a threshold to check which coefficients of the equalizer 130 have more influence for system, it marks these coefficients and sends the marking information to the shape extension circuit 1425. Since the coefficients located adjacent these marked coefficients have a high probability to be significant, the shape extension circuit 1425 is used to select the marked coefficients and their adjacent coefficients as significant coefficients and store these significant coefficients into the coefficients backup storage unit 135. FIG. 15 is a flow chart for illustrating the operation of the burst noise suppressing apparatus of the sixth embodiment. Initially, when on burst noise occurs, the equalizer 130 (EQ) performs a normal operation (step S1501). And the burst noise detector 131 keeps detecting the burst noise. When the normal operation is performed, the significant taps selection unit 136 periodically checks which coefficients of the equalizer 130 are significant (step S1503) and backups the significant coefficients of the equalizer 130 by the coefficients backup storage unit 135 (step S1505). If the burst noise detector 131 detects a burst noise, go to step S1509; otherwise, go back to step S1501 (step S1507). Once a burst noise is detected, the burst noise detector 131 drives the switching unit 133 to stop the signal transfer from the error estimator 134 to the equalizer 130 and transfer the significant coefficients previously stored in the coefficient backup storage unit 135 to the equalizer 130. Thus, when a burst noise occurs, the significant coefficients of the equalizer 130 are restored by using the backup coefficients sent from the coefficient backup storage unit 135 (step S1509). As for the non-significant coefficients of the equalizer 130, they can be set to zero or maintained. Hence, the equalizer 110 generates output signals with restored significant coefficients (step S1511). And the burst noise detector 131 still keeps detecting the burst noise when the significant coefficients of the equalizer 130 are restored. If the burst noise detector 131 still detects a burst noise, go back to step S1511; otherwise, go to step S1501 (step S1513). In this way, the equalizer 130 of the sixth embodiment performs a normal operation when no burst noise occurs and a coefficient-restored operation to prevent the interference of the burst noise when a burst noise occurs. Moreover, using the sixth embodiment does not need to have a coefficient backup storage unit with a large storing capacity and thus reduces the cost.

To sum up, the present invention provides a burst noise suppressing apparatus and its method to reduce the interference of a burst noise. The apparatus of the present invention can perform a direct signal-to-noise ratio (SNR) measurement or a threshold detection of soft decision errors or checks a distribution of hard decision errors to detect a burst noise. Once a burst noise is detected, the apparatus of the present invention can reduce the interference of the burst noise by freezing the coefficients of the equalizer or restoring all or significant coefficients of the equalizer. In this way, the shortcoming of the prior art that requires a lot of time to recover the original state of the equalizer is removed.

What is claimed is:

1. A burst noise suppressing apparatus, comprising:
an adaptive apparatus for equalizing a signal-transmitting channel, the adaptive apparatus having a plurality of coefficients set therein and processing signals received from the signal-transmitting channel according to the coefficients, wherein the adaptive apparatus updates the coefficients according to a current state of the signal-transmitting channel by employing an error estimator;
a burst noise detector used to detect a burst noise occurring in the signal-transmitting channel; and
an ON/OFF switching unit used to stop the error estimator from updating the coefficients of the adaptive apparatus when the burst noise is detected by the burst noise detector,
wherein the burst noise detector has a signal-to-noise ratio (SNR) measurement circuit that measures a SNR value of the signals that have been processed by the adaptive apparatus; and
wherein the ON/OFF switching unit further backups the significant coefficients of the adaptive apparatus, and stops the error estimator from updating the coefficients of the adaptive apparatus and restores the significant coefficients of the adaptive apparatus according to the significant coefficients stored previously when the burst noise is detected by the burst noise detector.

2. The burst noise suppressing apparatus as claimed in claim 1, wherein the ON/OFF switching unit comprises a coefficients backup storage unit, a significant taps selection unit and a switching unit, the significant taps selection unit is used to select significant ones of the coefficients of the adaptive apparatus, the coefficients backup storage unit is used to periodically backup the significant coefficients of the adaptive apparatus, and the switching unit is used to stop the error estimator from updating the coefficients of the adaptive apparatus and restore the significant coefficients of the adaptive apparatus according to the significant coefficients stored previously in the coefficients backup storage unit when the burst noise is detected by the burst noise detector.

3. The burst noise suppressing apparatus as claimed in claim 2, wherein the significant taps selection unit has a threshold detection circuit, which is used to determine the significant ones of the coefficients of the adaptive apparatus.

4. The burst noise suppressing apparatus as claimed in claim 3, wherein the coefficients of the adaptive apparatus that are larger than an upper threshold or smaller than a lower threshold are marked as the significant coefficients.

5. The burst noise suppressing apparatus as claimed in claim 2, wherein the significant taps selection unit further has a threshold detection circuit and a shape extension circuit, the threshold detection circuit is used to mark the coefficients of the adaptive apparatus that are larger than an upper threshold or smaller than a lower threshold, the shape extension circuit is used to select the marked coefficients of the adaptive apparatus and the coefficients of the adaptive apparatus that are located adjacent the marked ones as the significant coefficients.

6. The burst noise suppressing apparatus as claimed in claim 2, wherein the significant taps selection unit has a channel estimator and a threshold detection circuit, the channel estimator is used to check the current state of the signal-transmitting channel and send corresponding channel information to the threshold detection circuit, the threshold detection circuit is used to determine the significant ones of the coefficients of the adaptive apparatus according to the channel information.

7. The burst noise suppressing apparatus as claimed in claim 2, wherein the significant taps selection unit has a channel estimator, a threshold detection circuit and a shape extension circuit, the channel estimator is used to check the current state of the signal-transmitting channel and send corresponding channel information to the threshold detection circuit, the threshold detection circuit uses at least a threshold to find and mark the coefficients of the adaptive apparatus that have more influence according to the channel information and sends marking information to the shape extension circuit, the shape extension circuit is used to select the marked coefficients of the adaptive apparatus and the coefficients of the adaptive apparatus that are located adjacent the marked ones as the significant coefficients.

8. The burst noise suppressing apparatus as claimed in claim 1, wherein the burst noise detector determines that the burst noise occurs when the SNR value of the signals that have been processed by the adaptive apparatus has a drop larger than a present value.

9. The burst noise suppressing apparatus as claimed in claim 1, wherein the burst noise detector has a hard-decision error estimator and a histogram analyzer, the hard-decision error estimator is used to estimate differences between the signals that have been processed by the adaptive apparatus and a preset threshold and send estimated values of the differences to the histogram analyzer to check whether the burst noise occurs or not.

10. The burst noise suppressing apparatus as claimed in claim 9, wherein the histogram analyzer further has a plurality of counters, which are assigned to count numbers of the estimated values belonging to histogram sections having different ranges and sends out counting results after every time a predetermined time expires.

11. The burst noise suppressing apparatus as claimed in claim 10, wherein the histogram analyzer further has a valid histogram judge to receive the counting results sent from the counters after every time the predetermined time expires, the valid histogram judge compares the counting results of the counters with a plurality of preset values of an upper bound recorded in a look-up table to check whether the burst noise occurs or not.

12. The burst noise suppressing apparatus as claimed in claim 11, wherein the valid histogram judge determines that the burst noise occurs if the counting results are larger than the upper bound.

13. The burst noise suppressing apparatus as claimed in claim 11, wherein the valid histogram judge has a plurality of look-up tables having different upper bounds recorded thereon.

14. The burst noise suppressing apparatus as claimed in claim 13, the histogram analyzer further has a long-term SNR measuring unit to measure a SNR value of the signal-transmitting channel, the valid histogram judge selects one of the look-up tables according to the SNR value provided by the long-term SNR measuring unit.

15. The burst noise suppressing apparatus as claimed in claim 14, the histogram analyzer further has a timer to count the predetermined time used to obtain the counting results.

16. The burst noise suppressing apparatus as claimed in claim 1, wherein the burst noise detector has a soft-decision error estimator to estimate a difference between the signals that have been processed by the adaptive apparatus and decoded signals sent from an error correction device (ECD) to provide estimated values.

17. The burst noise suppressing apparatus as claimed in claim 16, wherein the error correction device is a trellis-coded modulation (TCM) decoder.

18. The burst noise suppressing apparatus as claimed in claim 16, wherein the burst noise detector further has a threshold indicator, which receives and checks the estimated values provided by the soft-decision error estimator.

19. The burst noise suppressing apparatus as claimed in claim 18, wherein the threshold indicator determines that the burst noise occurs if a number of the estimated values larger than a first predetermined threshold or smaller than a second predetermined threshold exceeds a target value.

20. A burst noise suppressing apparatus, comprising:
an adaptive apparatus for equalizing a signal-transmitting channel, the adaptive apparatus having a plurality of coefficients set therein and processing signals received from the signal-transmitting channel according to the coefficients, wherein the adaptive apparatus updates the coefficients according to a current state of the signal-transmitting channel by employing an error estimator;
a burst noise detector used to detect a burst noise occurring in the signal-transmitting channel; and
an ON/OFF switching unit used to stop the error estimator from updating the coefficients of the adaptive apparatus when the burst noise is detected by the burst noise detector,
wherein the burst noise detector has a signal-to-noise ratio (SNR) measurement circuit that measures a SNR value of the signals that have been processed by the adaptive apparatus, and further has a soft-decision error estimator and a threshold indicator, the soft-decision error estimator estimating a difference between the signals that have been processed by the adaptive apparatus and decoded signals sent from an error correction device (ECD) to provide estimated values, the threshold indicator determining that the burst noise occurs if a number of the estimated values larger than a first predetermined threshold or smaller than a second predetermined threshold exceeds a target value, and
wherein the ON/OFF switching unit comprises a coefficients backup storage unit, a significant taps selection unit and a switching unit, the significant taps selection unit is used to select significant ones of the coefficients of the adaptive apparatus, the coefficients backup storage unit is used to periodically backup the significant coefficients of the adaptive apparatus, and the switching unit is used to stop the error estimator from updating the coefficients of the adaptive apparatus and restore the significant coefficients of the adaptive apparatus according to the significant coefficients stored previously in the coefficients backup storage unit when the burst noise is detected by the burst noise detector.

21. The burst noise suppressing apparatus as claimed in claim 20, wherein the significant taps selection unit has a threshold detection circuit, which is used to determine the significant ones of the coefficients of the adaptive apparatus.

22. The burst noise suppressing apparatus as claimed in claim 21, wherein the coefficients of the adaptive apparatus that are larger than an upper threshold or smaller than a lower threshold are marked as the significant coefficients.

23. The burst noise suppressing apparatus as claimed in claim 20, wherein the significant taps selection unit further has a threshold detection circuit and a shape extension circuit, the threshold detection circuit is used to mark the coefficients of the adaptive apparatus that are larger than an upper threshold or smaller than a lower threshold, the shape extension circuit is used to select the marked coefficients of the adaptive apparatus and the coefficients of the adaptive apparatus that are located adjacent the marked ones as the significant coefficients.

24. The burst noise suppressing apparatus as claimed in claim 20, wherein the significant taps selection unit has a channel estimator and a threshold detection circuit, the channel estimator is used to check the current state of the signal-transmitting channel and send corresponding channel information to the threshold detection circuit, the threshold detection circuit is used to determine the significant ones of the coefficients of the adaptive apparatus according to the channel information.

25. The burst noise suppressing apparatus as claimed in claim 20, wherein the significant taps selection unit has a channel estimator, a threshold detection circuit and a shape extension circuit, the channel estimator is used to check the current state of the signal-transmitting channel and send corresponding channel information to the threshold detection circuit, the threshold detection circuit uses at least a threshold to find and mark the coefficients of the adaptive apparatus that have more influence according to the channel information and sends marking information to the shape extension circuit, the shape extension circuit is used to select the marked coefficients of the adaptive apparatus and the coefficients of the adaptive apparatus that are located adjacent the marked ones as the significant coefficients.

* * * * *